United States Patent
Ginnings

(10) Patent No.: US 7,773,586 B1
(45) Date of Patent: Aug. 10, 2010

(54) SYSTEM AND METHOD FOR UPDATING CONFIGURATION DATA WITHIN A SIGNAL TRANSFER POINT

(75) Inventor: Christopher R. Ginnings, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 212 days.

(21) Appl. No.: 11/970,610

(22) Filed: Jan. 8, 2008

(51) Int. Cl.
*H04L 12/66* (2006.01)
*H04M 7/00* (2006.01)

(52) U.S. Cl. .................................. 370/352; 379/221.1
(58) Field of Classification Search ............... 379/221.1
See application file for complete search history.

(56) References Cited

U.S. PATENT DOCUMENTS

| 6,104,796 | A | 8/2000 | Kasrai |
| 6,744,866 | B1 * | 6/2004 | Nolting et al. ............ 379/133 |
| 6,993,038 | B2 | 1/2006 | McCann |
| 2003/0227899 | A1 | 12/2003 | McCann |
| 2004/0022379 | A1 | 2/2004 | Klos et al. |
| 2004/0203439 | A1 * | 10/2004 | Zerressen .............. 455/67.11 |
| 2005/0099964 | A1 | 5/2005 | Delaney et al. |
| 2007/0036076 | A1 * | 2/2007 | Boggs .................... 370/230 |
| 2009/0168652 | A1 * | 7/2009 | Lynette et al. ............. 370/238 |

* cited by examiner

*Primary Examiner*—Gregory B Sefcheck
*Assistant Examiner*—Suk Jin Kang

(57) ABSTRACT

Configuration data within a Signal Transfer Point (STP) is updated to support a new trunk line in an automatic fashion by a computer system. A user is prompted for a first and second point code for switches on either end of the new trunk line, and the identity of one or more STPs is determined from the second point code. One or more linksets are determined from the first and second point codes. Network configuration data is then retrieved from the STPs, and linksets corresponding to the first point code are determined. New signaling data to support the new trunk line is automatically generated from the point codes and the linksets, and the new signaling data is inserted into the configuration data. The modified configuration data is then stored back into the STPs.

16 Claims, 7 Drawing Sheets

| 406 | 410 | 414 | 418 |
|---|---|---|---|
| CLLI | Point Code | Route Set Master | Linkset |
| 408 | 412 | 416 | 420 |
| | | | |
| | | | |

Table A: MAIN OPC TABLE — 400

| 422 | 426 |
|---|---|
| Linkset | OPC Pointer |
| 424 | 428 |
| | |
| | |

Table B: GATEWAY TABLE — 402

| 430 | 434 | 438 | 442 |
|---|---|---|---|
| OPC Pointer | OPC | Remarks | SI Pointer |
| 432 | 436 | 440 | 444 |
| | | | |
| | | | |

Table C: OPC AUTHORIZATION TABLE — 404

Figure 4

| SI Pointer 504 | Standard Information 508 | DPC Pointer 512 |
|---|---|---|
| 506 | 510 | 514 |
| | | |
| | | |
| | | |

Table D: SI TABLE

| DPC Pointer 516 | DPC 520 | Remarks 524 |
|---|---|---|
| 518 | 522 | 526 |
| | | |
| | | |
| | | |

Table E: DPC TABLE

Figure 5

SYSTEM AND METHOD FOR UPDATING CONFIGURATION DATA WITHIN A SIGNAL TRANSFER POINT

BACKGROUND OF THE INVENTION

1. Field of the Invention

The invention is related to the field of communications, and in particular, to a method of updating configuration data in a signal transfer point that processes communication messages for a communication network.

2. Description of the Prior Art

Refer to FIG. 1 as an example of a prior art telecommunications network, with a first device 100 placing a call to a second device 112. The actual voice data travels a path from the first device 100 to the first switch 104, and then through a trunk line 106 to a second switch 108 and on to the second device 112. Signaling messages are used to set up these connections to transfer calls. These connections may include many more switches and other devices than shown in this example, making the task even more complex. In this example, the first switch 104 sends a signaling message to its signal transfer point (STP) 118, which then sends a signaling message to a different signal transfer point 122 corresponding to the second switch 108. These signaling messages are used to set up the switches such that they agree on which of the many channels in the trunk line is used to convey the call from the first switch 104 to the second switch 108.

Each signal transfer point contains a quantity of network configuration data. This configuration data tells the STP which external STPs are allowed to send it messages over which linksets (lines connecting the STPs), and what data format to expect them to use. If an external STP sends a signaling message over an incorrect linkset or in an incorrect format, the receiving STP ignores the signaling message, and the corresponding call is dropped. As may be expected, the amount of configuration data for each STP is quite large and complex. If any errors exist in the data, the receiving STP will not process the signaling messages correctly, and calls may be dropped. Thus, it is critical that the configuration data be maintained as error-free and as up-to-date as is possible.

When one communication company adds a new trunk line from one of their switches to a switch owned by a different communication company, various problems arise. The companies must communicate with each other sufficient configuration information about the new trunk line such that all of the involved STPs may be updated to take advantage of the bandwidth offered by the new trunk line. Typically, employees of each company must edit the configuration data for each of their respective STPs to add routing data for the new trunk line. Often this involves editing very large data files (for example, in the format of tables as shown in FIGS. 4 and 5), finding a logical place in the data files to add the new routing data, adding the data, and saving the modified configuration data back to the STPs. If any mistakes are made in any of these steps, calls intended for the new trunk line will be dropped.

Since current telecommunications networks are constantly being modified and improved, changes to configuration data within signal transfer points are very common. Given the frequency of changes to the configuration data by human operators, errors are virtually inevitable, and will result in reduced quality of service (QoS) to the customers. Obviously, given the complexity of the data, detection and correction of errors is a time-consuming and difficult job.

Computer systems currently exist that allow users to modify configuration data within STPs. However, they have been programmed for specific types of modifications to the configuration tables containing the data. Since they do not search within the configuration tables, users are required to specify rows and columns within the configuration tables for modification. Also, these current programs are limited in the types of modifications they are capable of performing. For example, complex modifications involving more than two linksets are currently beyond the scope of present computer programs. These limitations may contribute to errors in the configuration data and result in reduced quality of service.

SUMMARY OF THE INVENTION

Configuration data within a Signal Transfer Point (STP) is updated to support a new trunk line in an automatic fashion by a computer system. A user is prompted for a first and second point code for switches on either end of the new trunk line, and the identity of one or more STPs is determined from the second point code. One or more linksets are determined from the first and second point codes. Network configuration data is then retrieved from the STPs, and linksets corresponding to the first point code are determined. New signaling data to support the new trunk line is automatically generated from the point codes and the linksets, and the new signaling data is inserted into the configuration data. The modified configuration data is then stored back into the STPs.

BRIEF DESCRIPTION OF THE DRAWINGS

FIG. 4, contains Tables A-C, illustrating data structures in an embodiment of the invention.

FIG. 5, contains Tables D and E, illustrating data structures in an embodiment of the invention.

DETAILED DESCRIPTION OF THE PREFERRED EMBODIMENT

Figure 1:
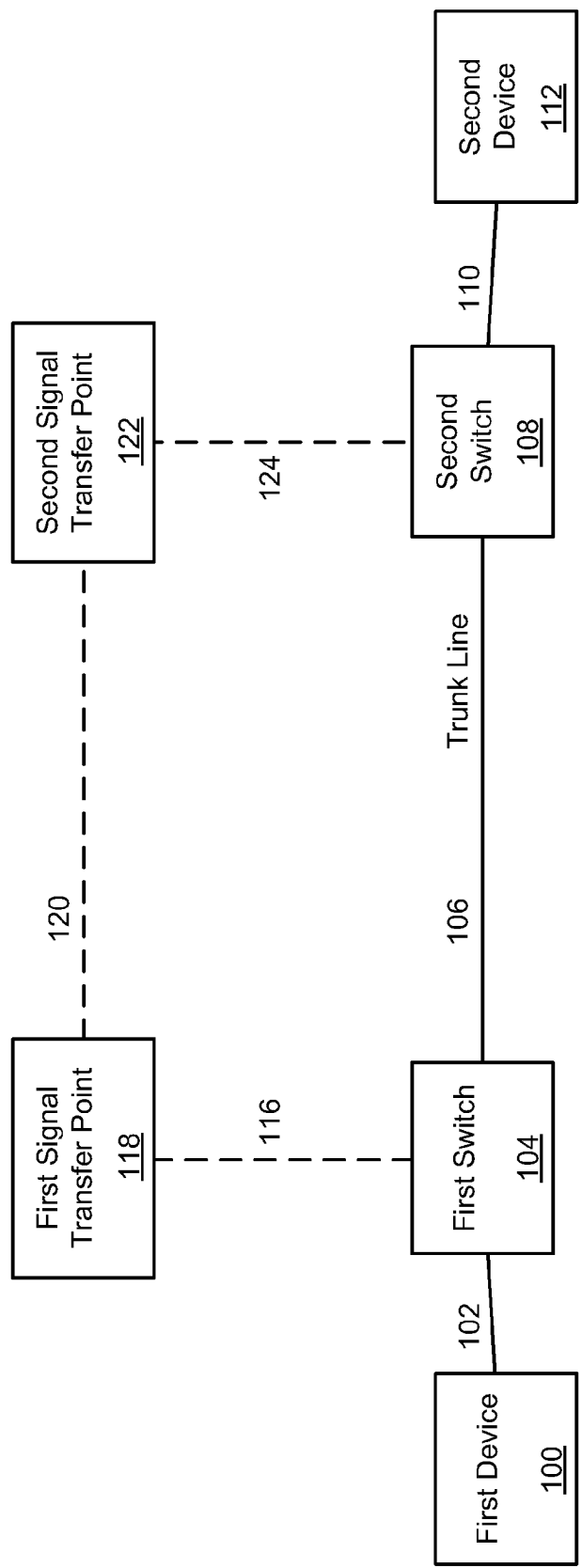
FIG. 1 is a block diagram illustrating a prior art communication system.
Figure 2:
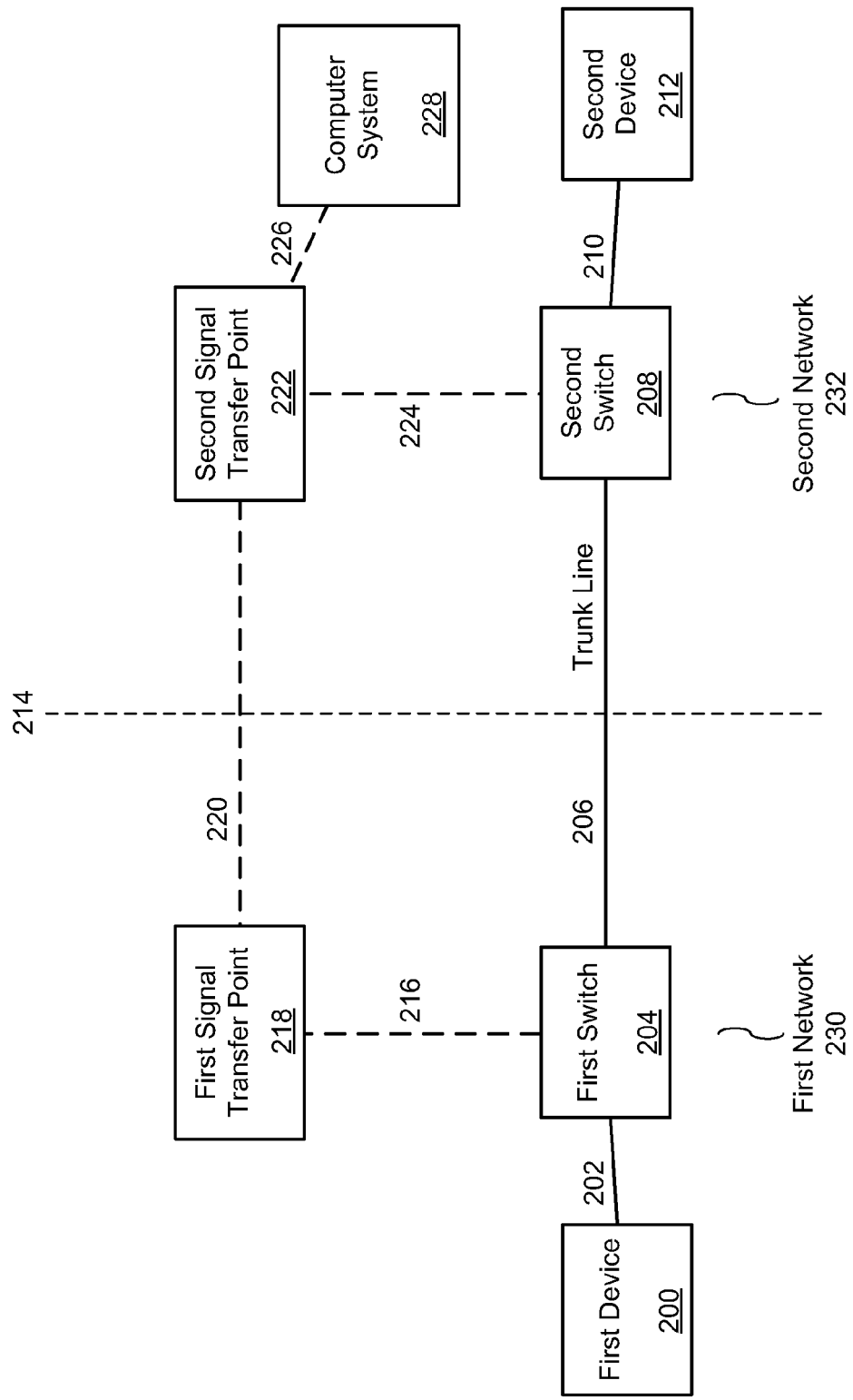
FIG. 2 is a block diagram illustrating a communication system in an embodiment of the invention.

FIG. 2 is a block diagram illustrating a communication system in an embodiment of the invention. In this exemplary embodiment of the present invention, a new trunk line 206 is created between two different networks. The boundary between the two networks is illustrated as dashed line 214. The first switch 204 in a first network 230 (on the left side of network boundary 214), is coupled to a first device 200, and a first signal transfer point (STP) 218. The first switch 204 is also coupled to a second switch 208 in a second network 232 (on the right side of network boundary 214) through a new trunk line 206. The second switch 208 is coupled to a second STP 222, and a second device 212. The devices 200 and 212 may be telephones on the public switched telephone network, mobile phones, or any other communication device capable of coupling to a communication system. Those of skill in the art will recognize that while this example embodiment shows direct connections 202 and 210 between the first device 200 and the first switch 204, and the second device 212 and the second switch 208, other embodiments may include a wide variety of other network devices between the first device 200 and the first switch 204, and the second device 212 and the second switch 208. For example, a local network or a wireless network or many other devices may reside between the first device 200 and the first switch 204, and the second device 212 and the second switch 208, all within the scope of the present invention. These connections, 202 and 210, are shown as direct connections for the purpose of simplifying FIG. 2. The first switch 204 and the second switch 208 are coupled through the first STP 218 and second STP 222 along a signaling path 216, 220 and 224 configured to transfer Signaling System 7 (SS7) signaling messages between the two networks.

For illustrative purposes, assume that a caller using the first (or origination) device 200 wishes to call a destination at the second device 212. In this case, voice data would need to be routed from the first device 200, to the first switch 204, through the new trunk 206, to the second switch 208, and on to the second device 212. Signaling data, for example, SS7 data, would need to travel from the first switch 204, to the first STP 218, on to the second STP 222, then to the second switch 208, through the signaling path 216, 220 and 224 in order to configure the switches 204 and 208 to properly connect the call. In this example, the Integrated Services Digital Network User Part (ISUP) is used to set up, coordinate, and tear down trunk calls on the SS7 network. The ISUP is the call control part of the SS7 protocol. In this case, the first switch 204 would have a first point code, and a first Common Language Location Identifier Code (CLLI Code), that are unique identifiers for the first switch 204. The second switch 208 would have a second point code, and a second CLLI Code, that are unique identifiers for the second switch 208. For communications flowing from the first switch 204 to the second switch 208, the first point code would be designated the Origination Point Code (OPC), and the second point code would be designated the Destination Point Code (DPC). For communications flowing from the second switch 208 to the first switch 204, the second point code would be designated the Origination Point Code (OPC), and the first point code would be designated the Destination Point Code (DPC). The new trunk line 206 would comprise a plurality of connections (electrical, wireless, optical, electromagnetic, or any other coupling mechanism) between the first switch 204 and the second switch 208. Those of skill in the art will recognize that the term "voice data" is used in this example for simplification, however any type of message data, such as video or other data may be transferred within the scope of the present invention.

Each of the STPs includes data corresponding to the configuration of the communication network. This data may take the form of a plurality of configuration tables as illustrated in FIGS. 4 and 5. In order to route voice (or message) data from the first switch 204 to the second switch 208 across the network boundary 214, the data in the STPs must be updated with information about the new trunk line 206 before voice (or message) data can be routed through the new trunk line 206. This update may be done through the use of a computer system 228 (similar to that of FIG. 6) coupled 226 to the second STP 222 through a communication interface, or any other interface capable of transferring data.

If the second STP 222 receives signaling data from the first STP 218 requesting a connection between the first switch 204 and the second switch 208 on a new trunk circuit 206 before the network configuration data in the second STP 222 is updated, the signaling data will be ignored, and no voice (or message) data will be able to use the new trunk. The configuration data in the STPs must be configured to recognize signaling data arriving on a proper linkset in the proper format. If an STP receives signaling data on incorrect linksets, or in improper formats it will not authorize the requested signaling path between the switches, and the call will be dropped.

In this example embodiment of the present invention, computer system 228 is used to update the data in the second STP 222. A user inputs the first and second point codes, and the CLLI code corresponding to the first point code into a computer program. The program then: (a) determines which STPs in the second network 232 will support signaling between the first switch 204 and the second switch 208, (b) downloads configuration tables from the STPs, (c) determines linksets in response to the point codes and the CLLI code, (d) generates new ISUP signaling data supporting the new trunk line, (e) inserts the new ISUP signaling data in the configuration tables, and (f) saves the modified configuration tables back into the STPs. The structures of some example configuration tables will be discussed with respect to FIGS. 4 and 5.

Figure 3A:
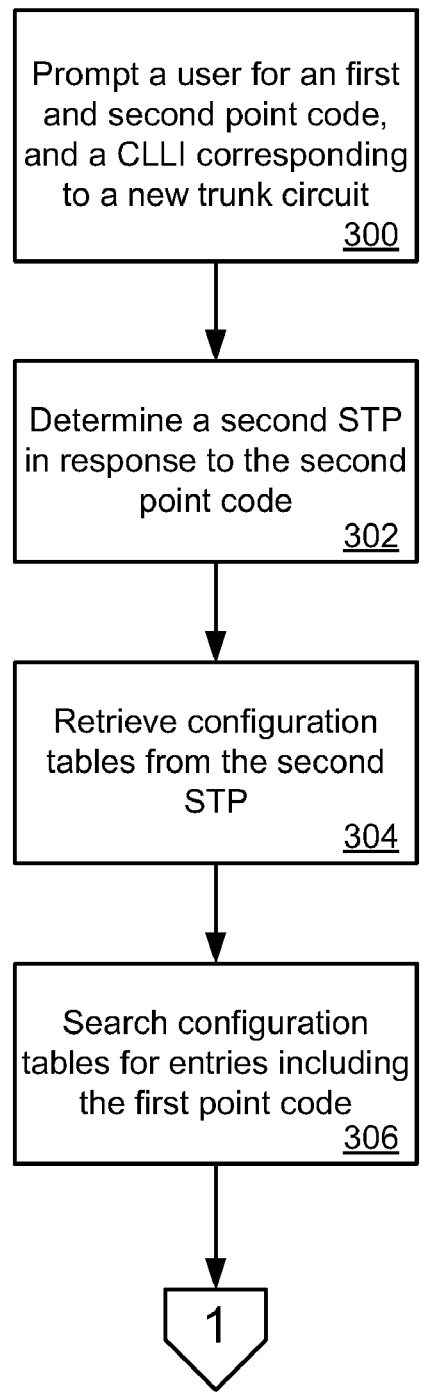
FIG. 3 is a flowchart illustrating a method of updating information within a communication system in an embodiment of the invention.
Figure 3B:
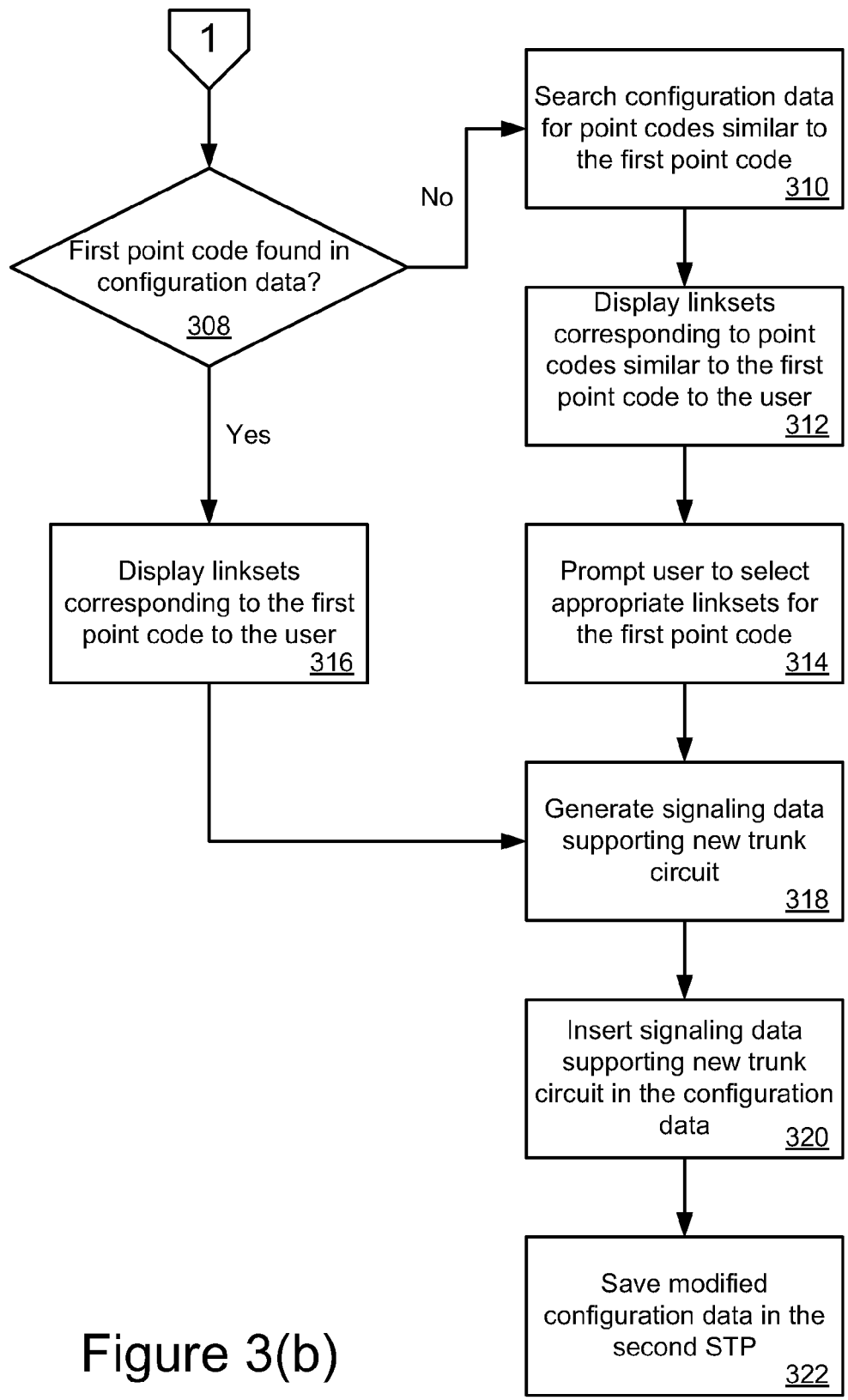

FIG. 3, illustrates a flowchart of a method of updating information within a communication system in an embodiment of the invention. In step 300, a user is prompted to enter a first point code, a second point code, and a CLLI code related to the first point code. In step 302, the identity of a second STP is determined in response to the second point code. This determination of the second STP may be accomplished in a wide variety of ways within the scope of the present invention. For example, a network architect may create a table correlating switches to STPs, or groups of switches may be assigned to one or more STP. In step 304, configuration data is retrieved from the second STP. In step 306, the configuration data is searched for entries corresponding to the first point code. In decision step 308, if entries corresponding to the first point code are found, control passes to step 316 and the linksets corresponding to the first point code are displayed to the user. If entries corresponding to the first point code are not found, the configuration data is searched to entries corresponding to point codes similar to that of the first point code in step 310. Those of skill in the art will recognize that there are a wide variety of methods which may be used to select point codes similar to the first point code. For example, the method may look for point codes corresponding to switches that are geographically near to the switch corresponding to the first point code. Alternatively, the method may look for point codes near the first point code in a network map, or any other method for determining similar point codes, all within the scope of the present invention. Then, in step 312, the linksets corresponding to the point codes similar to the first point code are displayed to the user, and in step 314 the user is prompted to select linksets to correspond to the first point code. In step 316, linksets are determined in response to the first point code and the CLLI. Once again, this determination may be accomplished using a wide variety of methods within the scope of the present invention. In an example embodiment of the present invention, the method searches the configuration data for entries having the first point code and displays the linksets from these entries to the user. As described above, if data entries for the first point code are not found in the configuration data, a quantity of linksets from similar point codes is displayed to the user, and the user is asked to select one or more linksets for use with the first point code. In a step 318, new ISUP signaling data supporting the new trunk line is generated from the first and second point codes, the CLLI, and the linksets. In step 320, the new ISUP signaling data is inserted into the configuration data. In step 322, the modified configuration data is saved back to the second STP. Those of skill in the art will recognize that not all of these steps are necessary or critical to the present invention, and that they may be performed in orders other than that illustrated in FIG. 5, all within the scope of the present invention.

FIG. 4, contains Tables A-C, illustrating data structures in an embodiment of the invention. A number of configuration tables will be discussed with respect to an example embodiment of the present invention. Those of skill in the art will recognize that the composition, structure, and arrangement of these tables may vary widely within the scope of the present invention. Other embodiments may comprise any amount of configuration data, in structures such as tables, arrays, and databases, all within the scope of the present invention.

Table A 400 as shown in FIG. 4 is the Main Originating Point Code Table 400. It comprises four columns of data: (a) the CLLI code of the originating (or first) switch 406, (b) the point code of the originating (or first) switch 410, (c) the Route Set Master 414, and (d) the linkset 418 of the external links from the first network 230 on which the second STP 222 receives signaling messages. The CLLI code 406 is an 11 character alpha-numeric identification of the first switch 204. Also note that the second switch 208 will also have a corresponding CLLI code. The point code 410 is the OPC corresponding to the first switch 204. The route set master 414 is a three digit code identifying the linksets that the originating switch 410 is authorized to use. The linkset 418 is the identifying datum corresponding to the signaling link 220 between the first STP 218 and the second STP 222.

Table B 402 as shown in FIG. 4 is the Gateway Table 402. It comprises two columns of data: (a) the linkset 422 from Table A, and (b) a corresponding OPC pointer 426. The linkset 424 of Table B corresponds to that of Table A. The OPC pointer 426 is used to index Table C described below.

Table C 404 as shown in FIG. 4 is the OPC Authorization Table 404. It comprises 4 columns of data: (a) the OPC pointer 430 from Table B, (b) the OPC 434, (c) remarks 438, and (d) the Service Indicator (SI) Pointer 442. The OPC pointer 432 of Table C corresponds to that of Table B and is used to index Table C. The OPC 436 is the same Originating Point Code discussed above. Remarks 440 reside in the Remarks 438 column. The SI Pointer 444 is used to index Table D described below.

FIG. 5, contains Tables D and E, illustrating data structures in an embodiment of the invention. A number of configuration tables will be discussed with respect to an example embodiment of the present invention. Those of skill in the art will recognize that the composition, structure, and arrangement of these tables may vary widely within the scope of the present invention. Other embodiments may comprise any amount of configuration data, in structures such as tables, arrays, and databases, all within the scope of the present invention.

Table D 500 as shown in FIG. 5 is the Service Indicator (SI) Table 500. It comprises three columns of data: (a) the SI Pointer 504 from Table C, (b) Standard Information 508, and (c) the Destination Point Code (DPC) Pointer 512. The SI pointer 506 of Table D corresponds to that of Table C and is used to index Table D. The standard information 510 lists the signaling message types that are allowed on the current linkset. The DPC pointer 514 is used to index Table E as described below.

Table E 502 as shown in FIG. 5 is the Destination Point Code (DPC) Table. It comprises three columns of data: (a) the DPC Pointer 516 from Table D, (b) the DPC 520, and (c) remarks 524. The DPC pointer 518 of Table E corresponds to that of Table D and is used to index Table E. The DPC 522 is the Destination Point Code (in this example embodiment, the second point code). Remarks 526 reside in the remarks column 524.

Figure 6:
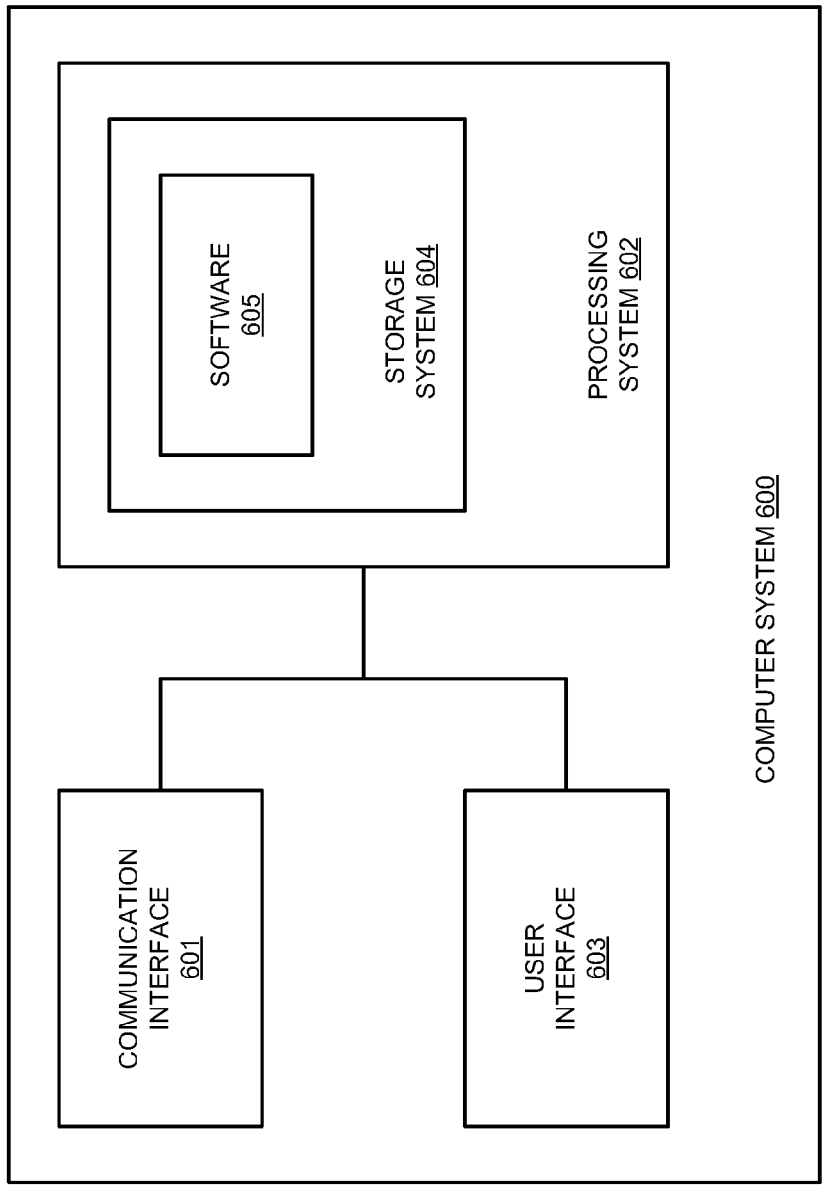
FIG. 6 is a block diagram illustrating a computer system in an embodiment of the invention.

FIG. 6 illustrates a block diagram of a computer system in an embodiment of the invention. Computer system 600 includes communication interface 601, processing system 602, and user interface 603. Processing system 602 includes storage system 604. Storage system 604 stores software 605. Processing system 602 is linked to communication interface 601 and user interface 603. Computer system 600 could be comprised of a programmed general-purpose computer, although those skilled in the art will appreciate that programmable or special purpose circuitry and equipment may be used. Computer system 600 may be distributed among multiples devices that together comprise elements 601-605.

Communication interface 601 could comprise a network interface, modem, port, transceiver, or some other communication device. Communication interface 601 may be distributed among multiple communication devices. Processing system 602 could comprise a computer microprocessor, logic circuit, or some other processing device. Processing system 602 may be distributed among multiple processing devices. User interface 603 could comprise a keyboard, mouse, voice recognition interface, microphone and speakers, graphical display, touch screen, or some other type of user device. User interface 603 may be distributed among multiple user devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions. When executed by processing system 602, software 605 directs processing system 602 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for updating configuration data within a signal transfer point (STP), comprising:
   on a computer system,
   (a) prompting a user for a first point code, and a second point code, and a Common Language Location Identifier code (CLLI code) corresponding to the first point code;
   (b) determining the identity of a second STP in response to the second point code;
   (c) retrieving configuration data from the second STP;
   (d) determining one or more linksets in response to the first point code and the CLLI code, wherein the step of determining one or more linksets comprises:
      (i) searching the configuration data for entries related to the first point code
      (ii) if entries related to the first point code are found, displaying the linksets from the entries related to the first point code to the user; and
      (iii) if entries related to the first point code are not found:
         (A) searching the configuration data for entries related to point codes similar to the first point code; and
         (B) displaying the linksets from the entries related to point codes similar to the first point code to the user; and (C) prompting the user to select one or more of the linksets from the entries related to point codes similar to the first point code;

(e) automatically generating new signaling data supporting a new trunk line from the first and second point codes, the CLLI code, and the linksets;

(f) inserting the new signaling data in the configuration data; and (g) storing the modified configuration data in the second STP.

2. The method of claim 1,
wherein the new signaling data comprises Integrated Services Digital Network User Part (ISUP) data.

3. The method of claim 1,
wherein the first point code corresponds to a first switch on a first network, and the second point code corresponds to a second switch on a second network.

4. The method of claim 3,
wherein the first and second networks are owned by different corporations.

5. The method of claim 3,
wherein the first switch is coupled to an origination device, and the second switch is coupled to a destination device.

6. The method of claim 5,
wherein the origination device and the destination device are telephones.

7. The method of claim 5,
wherein the origination device and the destination device are cellular phones.

8. The method of claim 1,
wherein the user is prompted through a Graphical User Interface (GUI).

9. A computer system comprising:
a processing system;
a user interface, coupled to the processing system; and
a communication interface, coupled to the processing system and to a second Signal Transfer Point (STP);
wherein the user interface is configured to prompt a user for a first point code, a second point code, and a Common Language Location Identifier code (CLLI code) corresponding to the first point code; and
wherein the processing system is configured to:
(a) determine the identity of second STP in response to the second point code;
(b) retrieve configuration data from the second STP;
(c) determine one or more linksets in response to the first point code and the CLLI code, wherein determining the one or more linksets comprises:
(i) searching the configuration data for entries related to the first point code;
(ii) if entries related to the first point code are found, displaying the linksets from the entries related to the first point code to the user; and
(iii) if entries related to the first point code are not found:
(A) searching the configuration data for entries related to point codes similar to the first point code;
(B) displaying the linksets from the entries related to point codes similar to the first point code to the user; and
(C) prompting the user to select one or more of the linksets from the entries related to point codes similar to the first point code;
(d) automatically generate new signaling data corresponding to a new trunk line from the first and second point codes, the CLLI code, and the linksets;
(e) insert the new signaling data in the configuration data; and
(f) store the modified configuration data in the second STP.

10. The computer system of claim 9,
wherein the new signaling data comprises Integrated Services Digital Network User Part (ISUP) data.

11. The computer system of claim 9,
wherein the first point code corresponds to a first switch on a first network, and the second point code corresponds to a second switch on a second network.

12. The computer system of claim 11,
wherein the first and second networks are owned by different corporations.

13. The computer system of claim 11,
wherein the first switch is coupled to an origination device, and the second switch is coupled to a destination device.

14. The computer system of claim 11,
wherein the origination device and the destination device are telephones.

15. The computer system of claim 14, wherein the origination device and the destination device are cellular phones.

16. The computer system of claim 9, wherein the user interface is a Graphical User Interface (GUI).

* * * * *